(12) United States Patent
Huesges et al.

(10) Patent No.: US 9,341,146 B2
(45) Date of Patent: May 17, 2016

(54) EXHAUST-GAS RECIRCULATION MODULE FOR AN INTERNAL COMBUSTION ENGINE

(75) Inventors: Hans-Juergen Huesges, Willich (DE); Hans-Ulrich Kuehnel, Moenchengladbach (DE); Peter Corbach, Bochum (DE)

(73) Assignee: PIERBURG GMBH, Neuss (DE)

( * ) Notice: Subject to any disclaimer, the term of this patent is extended or adjusted under 35 U.S.C. 154(b) by 239 days.

(21) Appl. No.: 14/006,319

(22) PCT Filed: Jan. 31, 2012

(86) PCT No.: PCT/EP2012/051553
§ 371 (c)(1),
(2), (4) Date: Sep. 20, 2013

(87) PCT Pub. No.: WO2012/126654
PCT Pub. Date: Sep. 27, 2012

(65) Prior Publication Data
US 2014/0007852 A1    Jan. 9, 2014

(30) Foreign Application Priority Data
Mar. 22, 2011  (DE) .......................... 10 2011 001 461

(51) Int. Cl.
*F01N 3/02* (2006.01)
*F02M 25/07* (2006.01)
*F28F 3/04* (2006.01)
*F28F 9/00* (2006.01)
*F28D 9/00* (2006.01)

(52) U.S. Cl.
CPC ........... *F02M 25/0727* (2013.01); *F02M 26/73* (2016.02); *F28D 9/0031* (2013.01); *F28F 3/048* (2013.01); *F28F 9/00* (2013.01); *F28F 2250/06* (2013.01); *Y02T 10/121* (2013.01)

(58) Field of Classification Search
CPC ..... Y02T 10/121; Y02T 10/144; Y02T 10/47; F02M 25/0707; F02M 25/0729; F02B 29/0406; F02D 41/0007; F02D 41/005
See application file for complete search history.

(56) References Cited

U.S. PATENT DOCUMENTS

| RE17,401 | E  | * | 8/1929  | Michell ...................... 123/41.67 |
| 1,739,035 | A | * | 12/1929 | Kleinow et al. ............... 122/4 R |
| 3,079,902 | A | * | 3/1963  | Ulbrich ....................... 123/41.69 |
| 7,363,919 | B1 | * | 4/2008  | Styles ....................... 123/568.12 |
| 2005/0056263 | A1 | * | 3/2005 | Kennedy ............. F02B 29/0418 123/568.12 |
| 2006/0288694 | A1 | * | 12/2006 | Hayashi ......................... 60/298 |
| 2007/0084206 | A1 | * | 4/2007 | Lew et al. ........................ 60/599 |
| 2007/0125081 | A1 | * | 6/2007 | Czarnowski ............ F01N 3/021 60/599 |
| 2008/0257316 | A1 | * | 10/2008 | Modien et al. ............. 123/568.2 |

(Continued)

FOREIGN PATENT DOCUMENTS

| CN | 101 526 048 A    | 9/2009 |
| DE | 10 2007 002 459 A1 | 7/2007 |

(Continued)

*Primary Examiner* — Hai Huynh
*Assistant Examiner* — Gonzalo Laguarda
(74) *Attorney, Agent, or Firm* — Norman B. Thot

(57) ABSTRACT

An exhaust-gas recirculation module for an internal combustion engine includes an outer housing, an exhaust-gas cooler comprising an inner housing arranged within the outer housing, an exhaust-gas recirculation valve arranged upstream of the exhaust-gas cooler, an exhaust-gas duct formed in the outer housing arranged upstream of the exhaust-gas recirculation valve, and a coolant channel arranged between the inner housing and the exhaust-gas duct.

17 Claims, 1 Drawing Sheet

(56) References Cited

U.S. PATENT DOCUMENTS

| | | | |
|---|---|---|---|
| 2008/0314569 A1* | 12/2008 | Yamazaki | F02M 37/0029 165/153 |
| 2009/0050302 A1 | 2/2009 | Husges et al. | |
| 2009/0056909 A1 | 3/2009 | Braun | |
| 2009/0188475 A1 | 7/2009 | Ueda | |
| 2009/0235662 A1* | 9/2009 | Knafl | 60/600 |
| 2009/0260605 A1 | 10/2009 | Janssen et al. | |
| 2010/0089043 A1 | 4/2010 | Dittmann et al. | |
| 2010/0132346 A1 | 6/2010 | Genoist et al. | |
| 2010/0263610 A1 | 10/2010 | Mercz et al. | |
| 2014/0041643 A1* | 2/2014 | Han | F02M 25/07 123/568.12 |

FOREIGN PATENT DOCUMENTS

| | | |
|---|---|---|
| EP | 2 175 221 A2 | 4/2010 |
| EP | 2 194 351 A1 | 6/2010 |
| JP | 4-292795 A | 10/1992 |
| JP | 2002-242767 A | 8/2002 |
| JP | 2004-116913 A | 4/2004 |
| JP | 2006-200381 A | 8/2006 |
| JP | 2009-2239 A | 1/2009 |
| WO | WO 03/098026 A1 | 11/2003 |
| WO | WO 2007/062939 A1 | 6/2007 |
| WO | WO 2009/058965 A1 | 5/2009 |

* cited by examiner

EXHAUST-GAS RECIRCULATION MODULE FOR AN INTERNAL COMBUSTION ENGINE

CROSS REFERENCE TO PRIOR APPLICATIONS

This application is a U.S. National Phase application under 35 U.S.C. §371 of International Application No. PCT/EP2012/051553, filed on Jan. 31, 2012 and which claims benefit to German Patent Application No. 10 2011 001 461.6, filed on Mar. 22, 2011. The International Application was published in German on Sep. 27, 2012 as WO 2012/126654 A1 under PCT Article 21(2).

FIELD

The present invention relates to an exhaust-gas recirculation module for an internal combustion engine, comprising an exhaust-gas cooler, an exhaust-gas recirculation valve which is arranged upstream of the exhaust-gas cooler, and an exhaust-gas duct arranged upstream of the exhaust-gas recirculation valve.

BACKGROUND

Such exhaust-gas recirculation modules are known. They serve to reduce pollutants in the exhaust gas of an internal combustion engine. For this purpose, there is usually provided, downstream of the exhaust manifold, a junction where the exhaust-gas discharge conduit branches off from the exhaust-gas recirculation conduit. The closer the exhaust-gas recirculation conduit is arranged toward the motor block, however, the higher the temperature of the exhaust gas will be, which in this area can still be about 700° C. Particularly when use is made of electromotorically driven exhaust-gas recirculation valves, the above effect will lead to a thermal overstressing of the electric motor and of the control unit of the electric motor, respectively.

This problem is circumvented by an arrangement as described in CN 101526048 A where, in the in-flow direction of the exhaust gas, a pre-cooler is arranged upstream of the exhaust-gas recirculation valve by which the exhaust gas is cooled to a temperature within the allowable range of the thermal stress of the actuator of the exhaust-gas recirculation valve. The temperature will thereby remain high enough to prevent a too massive soot deposition on the exhaust-gas recirculation valve. The disclosed use of two individual cooling devices which, respectively, via tube conduits, are connected to an intermediate exhaust-gas recirculation valve, will nonetheless result in a high constructional space requirement and a high expenditure for assembly.

SUMMARY

An aspect of the present invention is to provide an exhaust-gas recirculation module which is minimized with regard to the constructional space requirements and the expenditure for assembly, while, at the same time, within a merely narrow constructional space, providing for a high cooling performance while protecting the exhaust-gas recirculation valve from overheating and soot deposition.

In an embodiment, the present invention provides an exhaust-gas recirculation module for an internal combustion engine which includes an outer housing, an exhaust-gas cooler comprising an inner housing arranged within the outer housing, an exhaust-gas recirculation valve arranged upstream of the exhaust-gas cooler, an exhaust-gas duct formed in the outer housing arranged upstream of the exhaust-gas recirculation valve, and a coolant channel arranged between the inner housing and the exhaust-gas duct.

BRIEF DESCRIPTION OF THE DRAWINGS

The present invention is described in greater detail below on the basis of embodiments and of the drawings in which.

DETAILED DESCRIPTION

Figure 1:
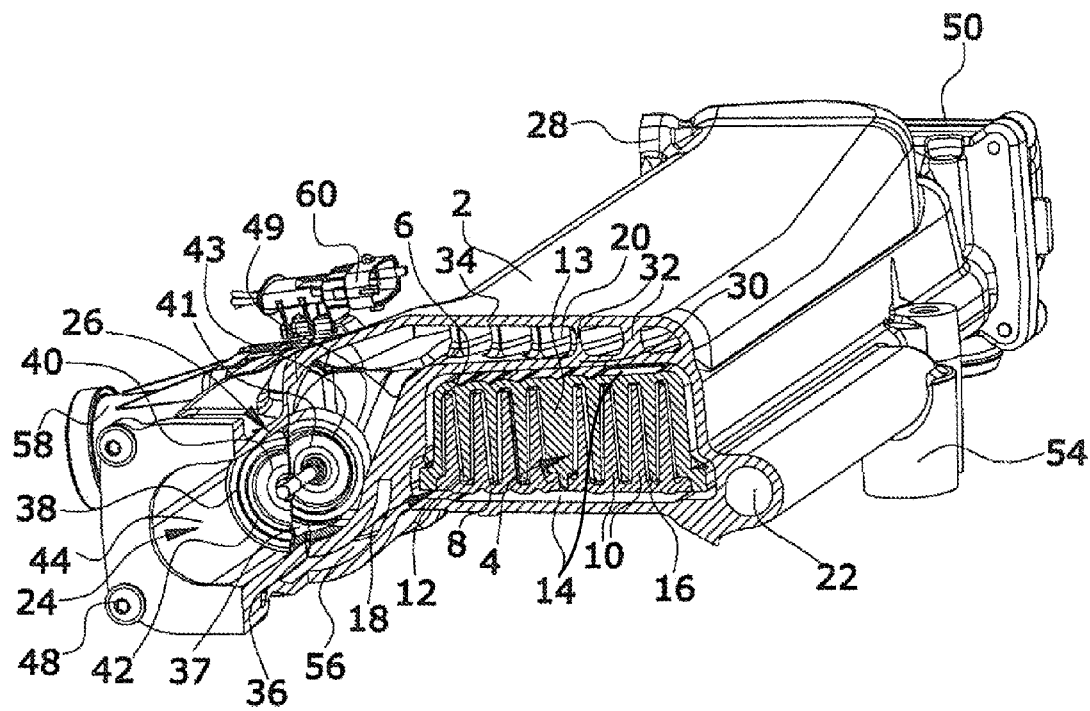
FIG. 1 shows a partly sectional view of exhaust-gas recirculation module of the present invention in three-dimensional representation.
Figure 2:
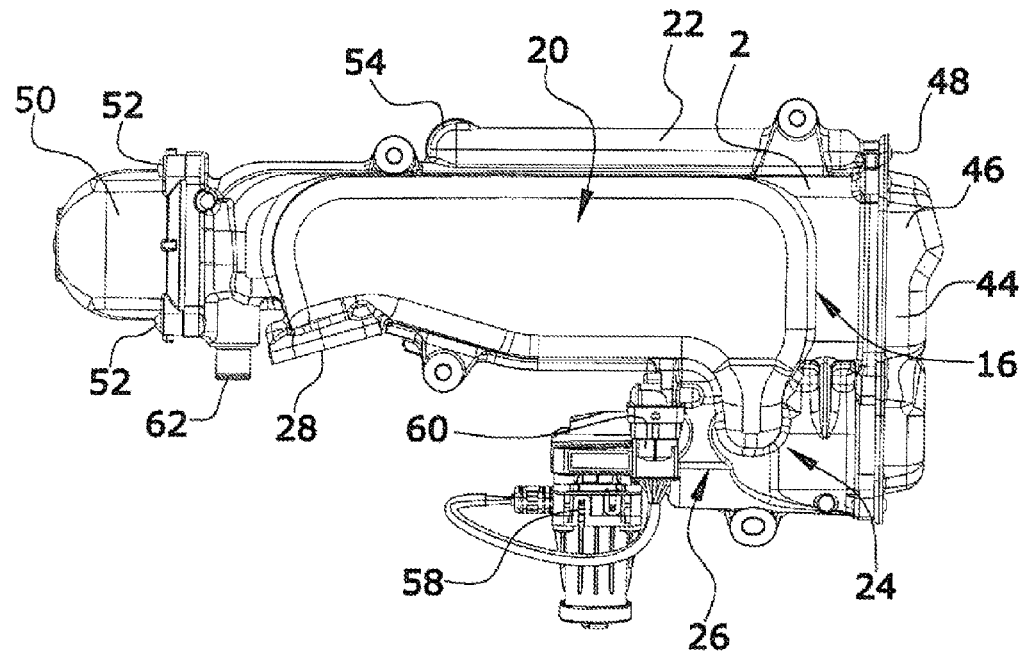
FIG. 2 shows a plan view of the exhaust-gas recirculation module of the present invention shown in FIG. 1.

By providing an exhaust-gas recirculation module comprises an outer housing in which the exhaust-gas duct is formed and an inner housing in which the exhaust-gas cooler is arranged, wherein a coolant duct is arranged between the inner housing and the exhaust-gas duct, the space requirement and the expenditure for assembly are minimized because no separate exhaust-gas duct must be used and because the component parts are arranged immediately adjacent to each other and can be produced in distinctly fewer process steps. The exhaust-gas duct is functional as a pre-cooler, which is rendered possible by the coolant duct arranged adjacent to the exhaust-gas duct, thereby already withdrawing heat from the exhaust gas, so that the thermal stress on the exhaust-gas-gas recirculation valve will be noticeably reduced.

In an embodiment of the present invention, the coolant duct can, for example, be formed as a coolant jacket surrounding the exhaust-gas cooler in cross section, the coolant duct being on one side separated from the exhaust-gas duct by a partition wall. A completely parallel course of the exhaust gas in the exhaust-gas duct and in the exhaust-gas cooler can thereby be realized, whereby, with minimized coolant paths, thermal energy can be dissipated from both ducts along the entire route of the exhaust-gas conveyance.

In an embodiment of the present invention, ribs can, for example, extend into the exhaust-gas duct from the partition wall. Via the arrangement of these ribs, an increased efficiency can be achieved along a short distance, and a pressure loss along the distance can be minimized.

A good cooling effect in the exhaust-gas duct is obtained if the ribs are connected to a wall opposite to the partition wall. By such an attachment to the opposite wall, it is further possible to conduct the distinctly reduced heat of the coolant to the opposite wall so that the opposite wall can also be used as a cooling surface.

In an embodiment of the present invention, the ribs are discontinuous in the flow direction of the exhaust gas since this will effect a better intermixing of the exhaust gas, thus preventing boundary layers. The cooling efficiency is increased in this manner.

In an embodiment of the present invention, the exhaust-gas recirculation valve is arranged in the outer housing, thus making it possible to omit further component parts, to avoid the necessity of infeed ducts and, as a result, to create an especially compact unit which can be pre-assembled.

In an embodiment of the present invention, a coolant duct section surrounding the exhaust-gas recirculation valve can, for example, be formed within the outer housing, the coolant duct section being in fluid connection with the coolant duct of the exhaust-gas cooler. It is thereby possible to also dissipate heat at the exhaust-gas recirculation valve, in turn thus reducing the constructional size of the exhaust-gas recirculation module and the thermal stress acting on the exhaust-gas recirculation valve.

In an embodiment of the present invention, the outer housing can, for example, be formed in one piece. Interfaces, and thus the expenditure for assembly, will thereby be reduced.

In an embodiment of the present invention, the outer housing can, for example, be a sand-cast component internally of which the exhaust-gas duct with its ribs can be cast together with the outer housing in a one step. The relatively high surface roughness will in turn effect a good heat transfer, thus preventing deposition of soot caused by the high temperatures in this area.

In an embodiment of the present invention, the inner housing consists of two pressure-cast components. These are arranged in the interior of the outer housing. The exhaust gas has already been pre-cooled when entering. In order to increase the flow velocity so as to avoid soot deposition, the ribs, when formed in the pressure-casting method, can be arranged at small distances relative to each other.

There is thus provided an easily assembled and less space-requiring exhaust-gas recirculation module by which, within a minimum of constructional space, high levels of efficiency are reached, while a failure-free function of the exhaust-gas recirculation valve and merely minimal soot deposition in the exhaust-gas cooler are safeguarded. A very high cooling performance is further achieved.

The exhaust-gas recirculation module of the present invention consists of two housings arranged within each other, with one of these housings, for example, formed in one piece by a sand-cast method, being an outer housing 2 accommodating therein an inner housing 4 preferably produced by a pressure-cast method. Inner housing 4 is of a two-part design and comprises a pot-shaped first housing part 6 and a second housing part formed as a cover 8 and closing the first housing part 6 when seen in a sectional view, wherein said housing parts are connected to each other, for example, by friction stir welding. Both from the cover 8 and from the first housing part 6, ribs 10 extend into the exhaust gas duct 12 formed in the interior of inner housing 4, the exhaust gas duct 12 being, in the present case, divided into two ducts separated by a longitudinal wall 13. The ribs 10 are arranged at a relatively small mutual distance.

Inner housing 4 is surrounded by a coolant duct which is formed as a coolant jacket 14 and is arranged between outer housing 2 and inner housing 4. In correspondence thereto, these two housings 2, 4, except at their mutually opposite front ends, are spaced from each other. The inner housing 4 together with the surrounding coolant jacket 14 thus forms an exhaust-gas cooler 16.

According to the present invention, the outer housing 2 comprises, apart from a receiving portion 18 accommodating the inner housing 4, an exhaust-gas duct 20 extending parallel to exhaust-gas cooler 16, and a coolant duct 22, and forms a receiving portion 24 for an exhaust-gas recirculation valve 26.

The exhaust-gas duct 20 extends from an exhaust gas inlet 28 in the interior of outer housing 2 to an opposite side. A wall delimiting the exhaust-gas duct 20 on one side, when viewed in cross section, is a partition wall 30 toward the coolant jacket 14 of exhaust-gas cooler 16. From this partition wall 30, ribs 32 extend into the exhaust-gas duct 20 up to an opposite wall 34 so that, via the contact of partition wall 30 to coolant jacket 14, the cooling effect will be transmitted to said opposite wall 34. In the flow direction of the exhaust gas, the ribs 32 are discontinuous, thus allowing for an intermixing of the exhaust-gas flow. These ribs 32 are spaced from each other distinctly farther than the ribs 10 of the exhaust-gas cooler 16 so that the pressure loss will remain low and production will be possible by sand-casting.

Exhaust-gas duct 20 is connected to a housing chamber 36 of exhaust-gas recirculation valve 26. Arranged in this housing chamber 36 is a valve stem 38 of exhaust-gas recirculation valve 26, on which two valve plates 40, 41 are fastened which cooperate with valve seats 42, 43 formed in a exhaust-gas recirculation valve housing 37 inserted into receiving portion 24. On the side of valve plate 40 opposite to housing chamber 36, a deflection chamber 44 is arranged which is formed by the outer housing 2 and by a cover 46 closing the outer housing 2 on this side, said cover 46 being fastened to outer housing 2 with the aid of screws 48. Deflection chamber 44 extends to a site in front of inner housing 4. This deflection chamber 44 is further fluidically connected, via a duct (not shown) between the exhaust-gas recirculation valve housing 37 and the outer housing 2, to a chamber 49 arranged in the outer housing 2 on the side of valve plate 41 opposite to housing chamber 36.

On the opposite side of the outer housing 2, there is fastened, by means of screws 52, a discharge housing 50 internally of which exhaust-gas back-check valves can be arranged.

As already mentioned, the outer housing 2 also has the coolant duct 22 formed in it. This duct extends from a coolant inlet 54 parallel to the exhaust-gas cooler 16 and comprises a fluidic connection to the coolant jacket 14. The latter in turn comprises a fluidic connection to a coolant duct section 56 which at least partially surrounds the exhaust-gas recirculation valve housing 37 and which effects a thermal shielding to an electromotoric actuator 58 of the exhaust-gas recirculation valve 26, said actuator 58 being connectable to a motor control unit via a plug 60. From the coolant duct section 56, the coolant can flow out again from outer housing 2 via a coolant outlet 62.

Thus, when exhaust gas is flowing via exhaust gas inlet 28 into exhaust-gas duct 20, this exhaust gas will be pre-cooled by the contact via the partition wall 30 and the ribs 32 so that, when the exhaust gas is entering the housing chamber 36 of exhaust-gas recirculation valve 26, the temperature of the exhaust gas will already have been reduced so far that a thermal overstressing of the exhaust-gas recirculation valve 26 will be avoided. At the same time, however, the temperature is still high enough to largely exclude a deposition of soot on the valve plates 40, 41 or the valve stem 38. In the opened state of the exhaust-gas recirculation valve 26, i.e., when the valve plates 40, 41 are lifted off from the valve seats 42, 43, the exhaust gas will flow from housing chamber 36 both via valve seat 42 further into deflection chamber 44, and, via valve seat 43, into chamber 49 as well as (via the duct between exhaust-gas recirculation valve housing 37 and outer housing 2) into the deflection chamber 44 in which the exhaust gas will be deflected by about 180° and flow into the exhaust gas duct 12 of exhaust-gas cooler 16. In the exhaust gas duct 12, there occurs a further heat dissipation by means of the inner housing 4 which is surrounded by a flow via coolant jacket 14, and by means of the ribs 10 fastened to cover 8 and first housing part 6. The exhaust gas will then leave the exhaust-gas recirculation module of the present invention through the discharge housing 50.

The above disclosed exhaust-gas recirculation module of the present invention is adapted to achieve a highly efficient exhaust-gas recirculation with high cooling efficiency within a minimized constructional space. The need for additional exhaust-gas or coolant ducts is obviated. The exhaust-gas recirculation valve is further provided so as to have a long operating life and a safe operation. In comparison to known designs, the expenditure for assembly is reduced.

It is to be understood that the subject matter of the present invention is not restricted to the described exemplary embodiment. Particularly, it could be envisioned to produce the various housings by way of other casting methods or to change the arrangement of the channels relative to each other. A flap valve could, for example, also be used as an exhaust-gas recirculation valve. The partitioning of the housings could also be changed.

The present invention is not limited to embodiments described herein; reference should be had to the appended claims.

What is claimed is:

1. An exhaust-gas recirculation module for an internal combustion engine, the exhaust-gas recirculation module comprising:
   an outer housing formed in one piece;
   an exhaust-gas cooler comprising an inner housing arranged within the outer housing;
   an exhaust-gas recirculation valve arranged upstream of the exhaust-gas cooler;
   an exhaust-gas duct arranged upstream of the exhaust-gas recirculation valve, the exhaust gas duct being formed by the outer housing;
   a coolant channel arranged between the inner housing and the exhaust-gas duct; and
   a partition wall,
   wherein, the coolant channel is formed as a coolant jacket configured to surround the exhaust-gas cooler in a cross section, the coolant channel being separated on one side from the exhaust-gas duct by the partition wall.

2. The exhaust-gas recirculation module as recited in claim 1, wherein the exhaust gas duct is configured to pre-cool an exhaust gas.

3. The exhaust-gas recirculation module as recited in claim 2, further comprising ribs configured to extend into the exhaust-gas duct from the partition wall.

4. The exhaust-gas recirculation module as recited in claim 3, further comprising a wall arranged opposite to the partition wall, the ribs being connected to the wall.

5. The exhaust-gas recirculation module as recited in claim 4, wherein the ribs are discontinuous in a flow direction of an exhaust gas.

6. The exhaust-gas recirculation module as recited in claim 1, wherein the exhaust-gas recirculation valve is arranged in the outer housing.

7. The exhaust-gas recirculation module as recited in claim 6, further comprising a coolant channel section arranged within the outer housing so as to surround the exhaust-gas recirculation valve and to be in a fluid connection with the coolant channel of the exhaust-gas cooler.

8. The exhaust-gas recirculation module as recited in claim 1, wherein the outer housing is a sand-cast component.

9. The exhaust-gas recirculation module as recited in claim 1, wherein the inner housing consists of two pressure-cast components.

10. An exhaust-gas recirculation module for an internal combustion engine, the exhaust-gas recirculation module comprising:
    an outer housing formed in one piece;
    an exhaust-gas cooler comprising an inner housing arranged within the outer housing;
    an exhaust-gas recirculation valve arranged upstream of the exhaust-gas cooler;
    an exhaust-gas duct arranged upstream of the exhaust-gas recirculation valve, the exhaust gas duct being formed by the outer housing and being configured to pre-cool an exhaust gas;
    a coolant channel arranged between the inner housing and the exhaust-gas duct; and
    a partition wall,
    wherein, the coolant channel is formed as a coolant jacket configured to surround the exhaust-gas cooler in a cross section, the coolant channel being separated on one side from the exhaust-gas duct by the partition wall.

11. The exhaust-gas recirculation module as recited in claim 10, further comprising ribs configured to extend into the exhaust-gas duct from the partition wall.

12. The exhaust-gas recirculation module as recited in claim 11, further comprising a wall arranged opposite to the partition wall, the ribs being connected to the wall.

13. The exhaust-gas recirculation module as recited in claim 12, wherein the ribs are discontinuous in a flow direction of an exhaust gas.

14. The exhaust-gas recirculation module as recited in claim 10, wherein the exhaust-gas recirculation valve is arranged in the outer housing.

15. The exhaust-gas recirculation module as recited in claim 14, further comprising a coolant channel section arranged within the outer housing so as to surround the exhaust-gas recirculation valve and to be in a fluid connection with the coolant channel of the exhaust-gas cooler.

16. The exhaust-gas recirculation module as recited in claim 10, wherein the outer housing is a sand-cast component.

17. The exhaust-gas recirculation module as recited in claim 10, wherein the inner housing consists of two pressure-cast components.

* * * * *